(12) United States Patent
Pristash

(10) Patent No.: US 7,442,462 B2
(45) Date of Patent: Oct. 28, 2008

(54) POLYMER ELECTROLYTE MEMBRANE FUEL CELL WITH TANDEM FUEL TANKS AND INERTIAL TRIGGER

(75) Inventor: David J. Pristash, Brecksville, OH (US)

(73) Assignee: Pemery Corporation, Brecksville, OH (US)

( * ) Notice: Subject to any disclaimer, the term of this patent is extended or adjusted under 35 U.S.C. 154(b) by 503 days.

(21) Appl. No.: 11/299,037

(22) Filed: Dec. 9, 2005

(65) Prior Publication Data

US 2006/0141321 A1 Jun. 29, 2006

Related U.S. Application Data

(60) Provisional application No. 60/634,265, filed on Dec. 9, 2004.

(51) Int. Cl.
*H01M 2/00* (2006.01)
*H01M 2/02* (2006.01)

(52) U.S. Cl. .............................. 429/34; 429/38; 429/44

(58) Field of Classification Search .................. 429/31, 429/32, 34, 38
See application file for complete search history.

(56) References Cited

U.S. PATENT DOCUMENTS 6,969,563 B1 * 11/2005 McLean ...................... 429/35

* cited by examiner

*Primary Examiner*—Patrick Ryan
*Assistant Examiner*—Ben Lewis
(74) *Attorney, Agent, or Firm*—Schiff Hardin LLP

(57) ABSTRACT

A fuel cell apparatus includes tandem storage tanks containing activation devices that release the oxidant gas and fuel gas to the fuel cell membrane when needed. The membrane assemblies surround the storage tanks, overlapping one another in a configuration more suited to use in environments with limited space than the traditional, stacked membrane assemblies. The activation devices are triggered by inertia to puncture membrane valves so that the oxidant gas and fuel gas is kept from the fuel cell membrane prior to inertial triggering and is supplied to the membrane after inertial triggering. The activation devices include spring loaded pivoting arms on supports that swing downward and outward upon subjecting the device to inertial forces.

30 Claims, 8 Drawing Sheets

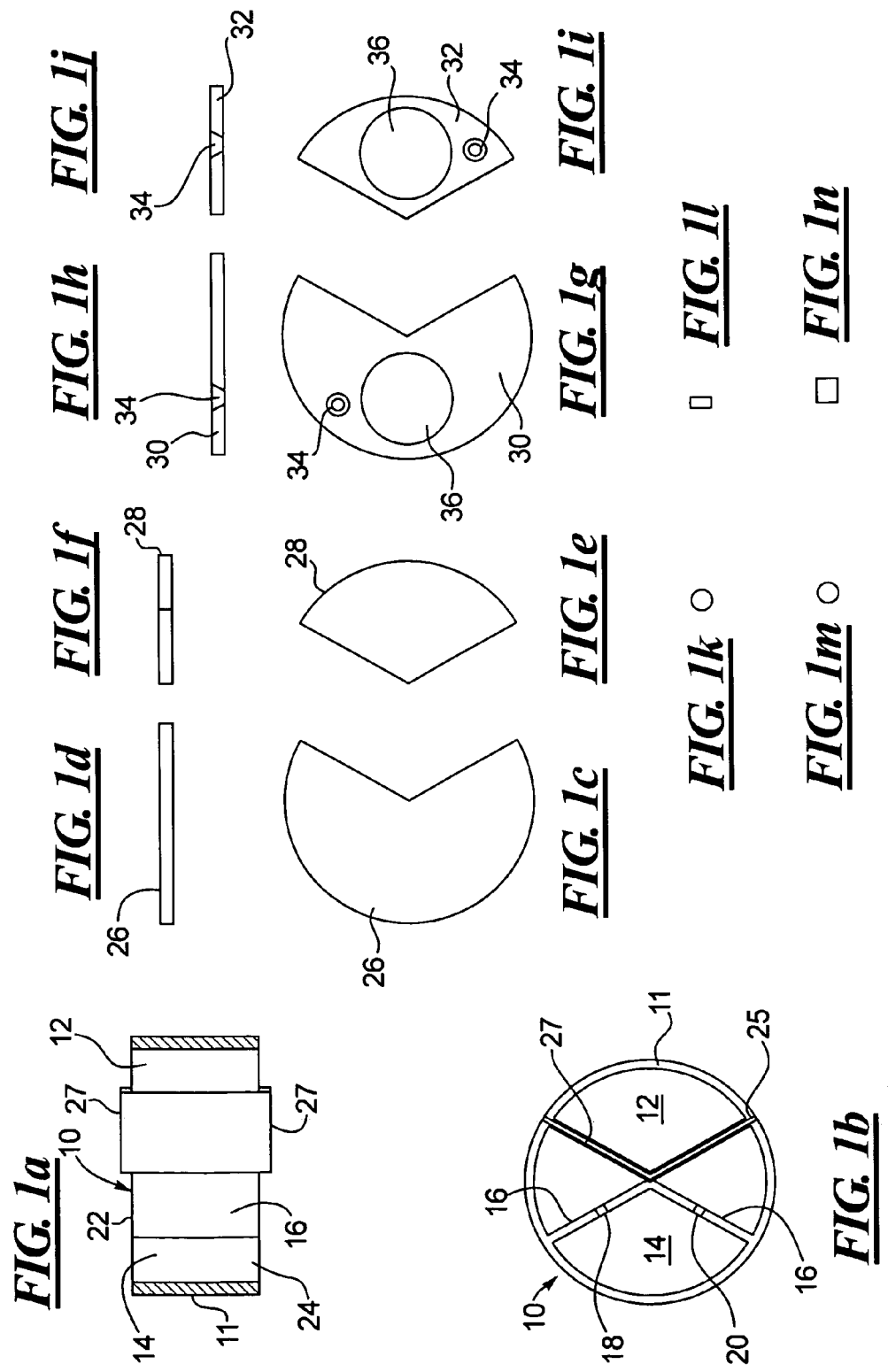

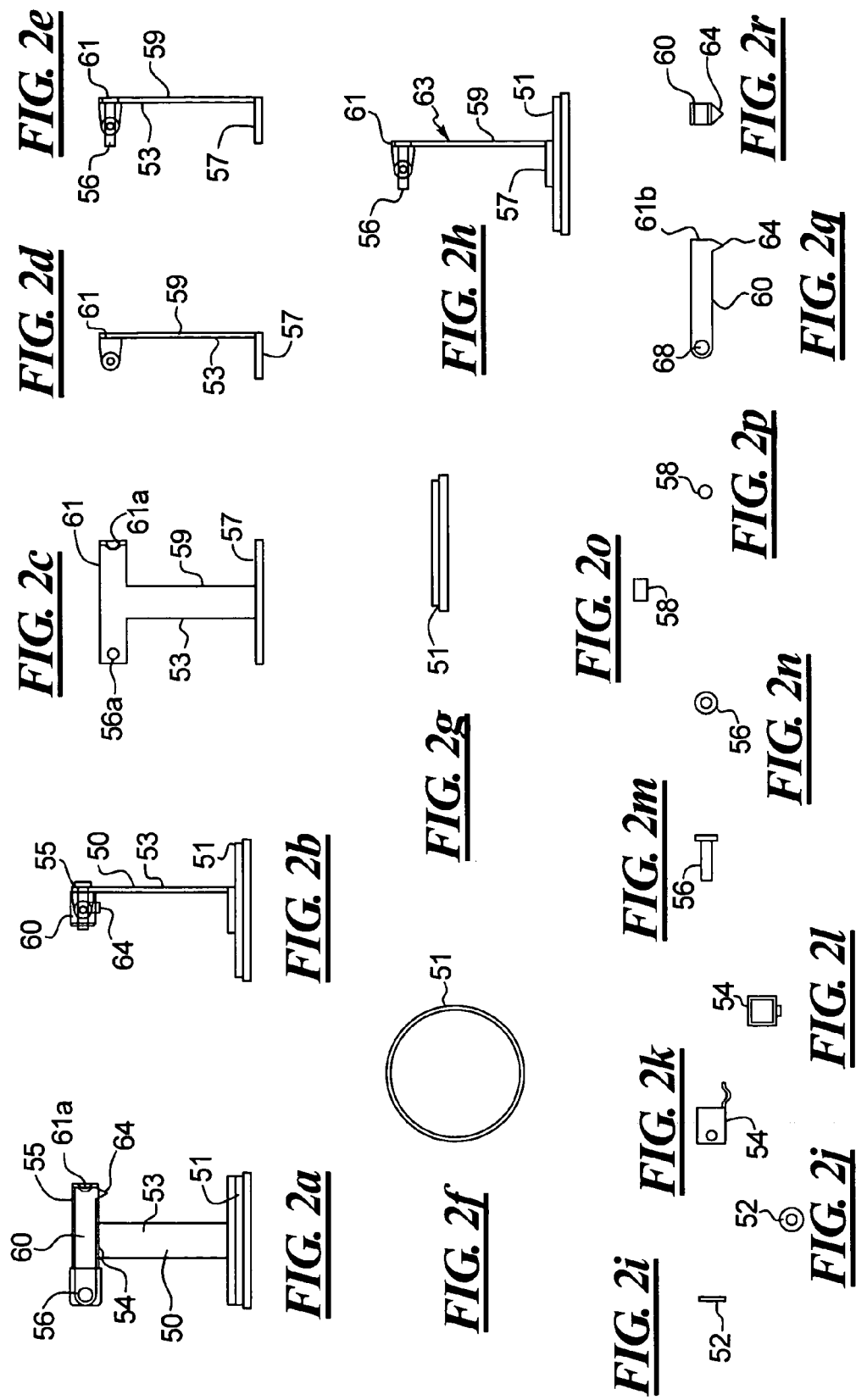

POLYMER ELECTROLYTE MEMBRANE FUEL CELL WITH TANDEM FUEL TANKS AND INERTIAL TRIGGER

CROSS-REFERENCE TO RELATED APPLICATION

This application claims the benefit of U.S. Provisional Patent Application Ser. No. 60/634,265, filed Dec. 9, 2004, which is incorporated herein by reference.

BACKGROUND OF THE INVENTION

1. Field of the Invention

The present invention relates generally to a fuel cell, and more particularly to a fuel cell using a polymer electrolyte membrane or the like.

2. Description of the Related Art

A fuel cell is an electrochemical energy conversion device. Fuel cells use an electrolyte membrane to catalytically react an input fuel, such as hydrogen, with an oxidant, such as oxygen, to produce an electrical current. The electrolyte membrane is sandwiched between two electrodes (an anode and a cathode). A catalyst on the anode promotes the oxidation of hydrogen molecules into hydrogen ions ($H^+$) and electrons. The hydrogen ions migrate through the electrolyte membrane to the cathode, where a cathode catalyst causes the combination of the hydrogen ions, electrons and oxygen, producing water. The electrons go through an external circuit that serves as an electric load while the ions move through the electrolyte toward the oppositely charged electrode. At the second electrode, the ions combine to create by-products of the energy conversion process, the byproducts being primarily water and heat. The flow of electrons through an external circuit produces electric current.

There are several types of fuel cells employing different types of electrolyte membranes, including: a phosphoric acid fuel cell, a molten carbonate fuel cell, a solid oxide fuel cell, and a polymer electrolyte membrane fuel cell, also referred to as a proton exchange membrane fuel cell.

The type of fuel cell that involves a polymer electrolyte membrane is hereinafter referred to as a PEM fuel cell. Developments in PEM fuel cell technology have produced fuel cells suitable for applications where the fuel cell will remain dormant for long periods of time before producing energy through electrochemical reaction. PEM fuel cells may include two very small storage tanks to hold the fuel and oxidant gases, such as hydrogen and oxygen, while the fuel cell is dormant. This type of storage tank is sometimes referred to as nanotechnology storage because of its small size. The reaction is initiated after the period of dormancy by the act of fracturing, puncturing, rupturing, or otherwise releasing the gases from the storage tanks to the PEM for the electrochemical reaction.

Work on PEM type fuel cells has produced fuel cells in the size range of 0.2 millimeters in thickness and capable of running for over 60,000 hours at 80 degrees Celsius. These PEM fuel cells are capable of producing better than 400 mA (milliamperes) of current per square centimeter, at 0.7 volts, in some applications, depending on whether air or oxygen is used on the cathode. The fuel cells may be stacked to deliver higher voltages. However, despite the advancements made in miniaturization of fuel cells, a fuel cell stacking arrangement is not feasible for some applications due to dimensional limitations of some environments where the fuel cells may be used.

For applications where fuel cells of the type described are to replace lithium reserve battery units, known to have a more limited shelf life, the cells may have to be accommodated within a physical location that affords a limited height to width ratio. In such applications, dimensions may be limited to a range of as little as ½ inch high and 1½ inch diameter. As stacked fuel cell assemblies usually exceed such dimensional limits, alternative fuel cell designs are necessary.

Required fuel cell performance under certain operational conditions is determined both theoretically and experimentally. When determining required performance of a fuel cell, different operating characteristics must be evaluated because the fuel cell will operate under a variety of abnormal conditions. For example, the fuel cell will provide energy below the normal Polymer Electrolyte Membrane fuel cell operation temperature of around 80 degrees Celsius. Fuel cells are also capable of running on pure oxygen or air, at pressures higher than atmospheric, and without hydration.

According to DuPont, Inc., the manufacturer of Nafion®, one of several possible membrane materials that may be used in the fuel cell, operating characteristics such as higher pressure and pure oxygen as the oxidant gas will improve performance of the fuel cell from the performance under normal conditions. However, though the fuel cell will operate without hydration, lack of hydration reduces fuel cell performance and can offset improved performance that results from other positive changes in operating conditions.

Available literature indicates that this increase in performance under certain conditions is due to a higher Gibbs free energy value. When one or more of the potential driving forces behind a chemical reaction is favorable and other factors are not, the Gibbs free energy value (G) reflects the balance between these forces. Gibbs free energy is measured by the relationship between system enthalpy and system entropy. The change in Gibbs free energy that occurs during a reaction is equal to the product of the change in temperature and the change in entropy of the system subtracted from the change in enthalpy of the system.

Performance curves can be generated to predict fuel cell voltage and current values of stacked membrane assemblies and alternative fuel cell configurations. In FIG. 4, a collection of performance curves has been generated to show the performance of a fuel cell under various conditions as indicated in the caption under the graph. The four performance curves grouped together on the higher portion of the chart in FIG. 4 show the expected performance of a hydrated fuel cell at various conditions. The conditions indicated are two different operating temperatures, 22 degrees C. and 80 degrees C. and two different pressures, 14.7 psi and 500 psi. The two performance curves toward the bottom of the chart in FIG. 4 show the expected performance without hydration, where one is for a fuel cell having the size of a D-size battery and the other curve is for a fuel cell according to the present invention, which is indicated as MOFA for Multi-Option Fuse for Artillery. The curve toward the top of each series demonstrates the performance of the Polymer Electrolyte Membrane (PEMERY™) battery curve, while the curve labeled "D" Size indicates where the performance of a typical D-sized PEMERY™ style battery would fall on the chart.

Another limitation presented by the environments in which polymer electrolyte fuel cells may be used is the ways in which the electrochemical reaction may be initiated after the long period of dormancy. The inventor has developed piston-type activators that can be used to initiate reaction in a fuel cell, but such activators are generally not easily adapted for use in all applications.

SUMMARY OF THE INVENTION

The present invention provides a fuel cell apparatus and method for addressing the need for specific power output requirements in environments where the space for a fuel cell or battery is limited. Rather than stacking polymer electrolyte membrane assemblies as has been done in prior developments, the membrane assemblies are wrapped around the core of the fuel cell, which contains the fuel gas and oxidant gas, in an overlapping fashion.

In another aspect of the invention, the fuel cell is configured to store fuel gas and oxidant gas within the confines of the fuel cell, with no need for external sources of fuel for the electrochemical reaction.

In yet a further embodiment, the fuel cell is configured to remain balanced while operating in a moving environment.

In yet another aspect of the invention, the activation of the electrochemical reaction in the fuel cell may be initiated by the motion of the environment in which the fuel cell is used through an activation device that is held in place until the appropriate force is applied to the fuel cell.

BRIEF DESCRIPTION OF THE DRAWINGS

FIGS. 1a, 1b, 1c, 1d, 1e, 1f, 1g, 1h, 1i, 1j, 1k, 1l, 1m, and 1n are side cross sectional views and plan views of the components of the gas storage tank and baffle configuration, with the locations of ports and other openings indicated, according to the principles of the present invention;

FIGS. 2a, 2b, 2c, 2d, 2e, 2f, 2g, 2h, 2i, 2j, 2k, 2l, 2m, 2n, 2o, 2p, 2q, and 2r are side and end views of the inertial switch subassembly, as well as a side and end views of each component of the subassembly, according to the principles of the present invention;

DETAILED DESCRIPTION OF THE PREFERRED EMBODIMENTS

Figure 3A:
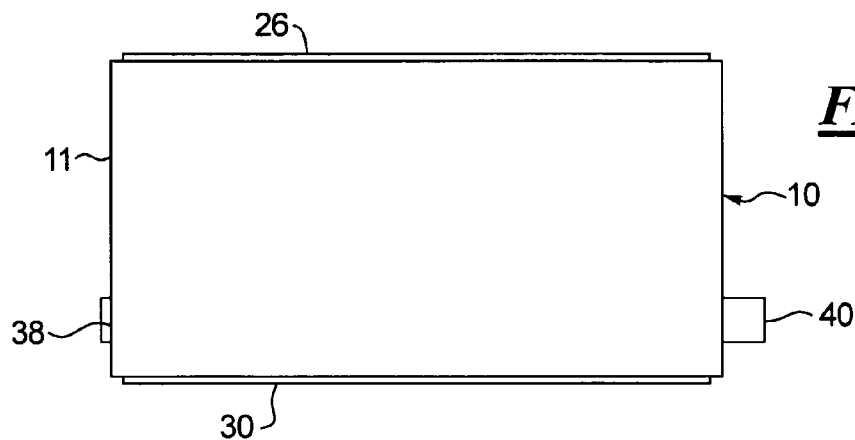
FIGS. 3a is a side view of the exterior of the fuel tank assembly and FIG. 3b is a top plan view of the fuel tank assembly of the fuel cell.

Referring to FIGS. 1a through 1n, a fuel cell according to an embodiment of the present invention includes a gas storage tank 10 shown in side cross sectional view in FIG. 1a and in end view in FIG. 1b. The tank 10 has a substantially circular cross section with a circular sidewall 11 and is subdivided into subunits or compartments 12 and 14 for separate storage of hydrogen and oxygen gas, as is apparent in FIG. 1b. The subunits are defined by baffles 16 which are placed in a substantially x-shaped configuration, defining four separate subunits or compartments in the storage tank 10. The baffles 16 are positioned along the full length (or height) of the storage tank 10 and are affixed to inside of the wall 11 the storage tank 10. In one embodiment, the tank 10, as shown in FIG. 1a has a diameter of 1.12 inches.

In FIG. 1b, the baffles 16 may be arranged so that the angles defined by the substantially x-shaped configuration are approximately 60 degrees and 120 degrees. Ports 18 and 20 are placed or otherwise formed in the baffles 16 so as to interconnect both 60 degree subunits to one of the 120-degree subunits. The generally expected proportion of hydrogen gas storage to oxygen gas storage in a tandem tank fuel cell is about two-to-one. The relevant proportions or sectors of a full annular profile, as expressed in degrees, would be in the range of 240 degrees for hydrogen storage and 120 degrees for oxygen storage. Other proportions of reactants are possible, and thus other proportions of tank sections may be provided. The tandem arrangement of the gas storage serves to maximize the gas storage and delivery system of the fuel cell, while minimizing the fuel cell's overall profile. The arrangement additionally serves to keep the hydrogen and oxygen gases isolated without requiring a complicated system to delivery the hydrogen and oxygen gases to a anode 78 and cathode 76 when needed.

In FIG. 1b, the storage tank 10 is divided into complementary portions by baffles 16. The portions defined by the baffles are connected by ports 18 and 20 to form appropriate proportions for storing hydrogen and oxygen gases. Alternatively, two separate tank subunits could be constructed in shapes and proportions required for the desired size and end application of the fuel cell. The latter fabrication may provide better gas containment, but the construction could be more complex and expensive The arrangement of the baffles 16 in the storage tank 10 also serves to provide balance for the storage tank 10 and the fuel cell as a whole. The fuel cell may be utilized in applications where the device the fuel cell is powering will be in a spinning motion and a properly balanced fuel cell will not disrupt the intended motion of the application. This invention can be applied in a variety of environments including, but not limited to, ordnance environments, personal safety alarms, emergency or investigatory tracking devices, deep space and undersea exploration, as well as any other appropriate applications. As many of these environments may involve motion of the apparatus containing the invention, a properly balanced fuel cell and gas storage unit are important.

The storage tank 10 in FIG. 1a is completed by covering a top 22 and a bottom 24 of the cylindrical wall to form an enclosure. The covering is configured to fit over the ends of the tank 10 and abut the ends of the baffles 16. In one embodiment, two of the baffle sections have extensions 25 and 27 that extend beyond the top 22 and bottom 24 of the storage tank 10. The baffle extensions 25 and 27 fit end plates as shown in FIGS. 1d-1j. The extension portions of the baffles 16 extending beyond the top 22 and bottom 24 as indicated in FIG. 1b correspond to the proportion of gases used in the fuel cell. The plate for covering the top 22 is in the illustrated embodiment formed in two pieces 26 and 28 as shown in FIGS. 1c, 1d, 1e and 1f, so as to conform to, and fit over, the top ends of each of the subunits or compartments 12 and 14 defined by the baffle 16 extensions 25 and 27. The baffle extensions 25 and 27 correspond to baffles 16 that are not provided with ports to link adjacent subunits, whereas the other baffles 16 are provided with the ports 18 and 20 for communication by the stored gases. The plate covering the bottom 24 is formed in two pieces 30 and 32, as indicated in FIGS. 1g, 1h, 1i and 1j so as to conform to, and fit over, the bottom ends of each of the subunits or compartments 12 and 14 as defined by the baffle 16 extensions 25 and 27. The top and bottom plates 26, 28, 30 and 32 close the subunits 12 and 14 and keep the gasses in the compartments separate from one another for those subunits not linked together with the ports 18 and 20 in the baffles 16. This construction makes it easier to isolate the subunits. The assembly is welded together, for example, by brazing or by a laser welding system.

Alternatively, the storage tank 10 or hydrogen and oxygen compartments 14 and 12 may have pockets machined into the walls where the top and bottom plates 22 and 24 may fit. Another possible embodiment might use machined areas in the storage tank 10 walls to properly position the top and bottom plates 22 and 24, rather than using the machined areas to hold the top and bottom plates 22 and 24 in place. The tank body 10 of one embodiment is wire cut from 304 stainless steel plate or bar stock. The top and bottom pieces 26, 28, 30 and 32 are machined from 304 stainless steel flat stock.

In FIGS. 1g, 1h, 1i and 1j, in the bottom plate 24 formed by the two parts 30 and 32 have at least two gas charging ports 34 are machined, or otherwise formed, to enable charging of gases to the storage tank 10. In the bottom plate 24 at least two additional access ports 36 are machined or otherwise formed. One of the access ports 36 is for the hydrogen subunit 14; and a second access port 36 is for the oxygen subunit 12. Activation devices 50 will be inserted into each subunit through the access ports 36 and welded in place in final assembly. The activation devices 50 may also be placed into pockets machined into either the top plate 22 or bottom plate 24 of the storage tank 10, the machined pockets eliminating the need for the access ports 36. Alternatively, the access ports 36 and gas charging ports 34 may be located in the top plate 22 of the storage tank 10.

FIGS. 1k, 1l, 1m and 1n show two bushings 38 and 40 that are machined, or otherwise formed, for insertion into the ports 34 located generally 180 degrees apart toward the bottom of the storage tank 10. These ports may, or may not, have the bushings 38 and 40 pressed in them. The ports 34 with the bushings 38 and 40 connect the storage tank 10 with the anode 78 and cathode 76 to allow hydrogen gas to flow out of the storage tank 10 to the anode 78 and oxygen gas to flow out of the storage tank 10 to the cathode 76. The ports 34 and bushings 38 and 40 are formed in the storage tank 10 walls, but the inner wall 90 of the storage tank 10 seals off the access to the ports 38 and 40 until the inner wall 90 is pierced by the activation devices 50 at the exact locations of the at least two ports 34. To achieve a reliable break in the storage tank walls 90 when the inertial arm 60 is activated, the at least two ports 34 are machined or otherwise formed to a precise, close, appropriately thin, dimension as determined by the specifics of the design and application. In the embodiment of the invention where the access ports 36 and gas charging ports 34 are located in the top plate 22 of the storage tank 10, rather than the bottom plate 24, the ports 38 and 40 located in the walls of the storage tank 10, should be placed toward the top of the storage tank 10, rather than the bottom of the storage tank 10.

The present inertial switch is configured to operate when the device is subjected to sufficient inertial force. Small inertial forces will not overcome the spring bias and so there may be considered to be a threshold of inertial force to trigger operation of the inertial switch, and thus opening of the gas storage containers and initiation power generation by the fuel cell. Selection of materials and construction of the inertial switch components and of the membrane to be pierced by the inertial switch enable the threshold to be changed, as desired. Thus, the present device may be configured to operate in different applications by such selection.

The construction of a sealed storage tank 10, divided into compartments for holding oxygen gas 12 and hydrogen gas 14 separately is designed to allow the fuel cell to be held dormant for an extended period of time. The inner wall 90 of the storage tank 10 must be of a thickness that the activation devices 50 are capable of piercing, but also sturdy enough to ensure that the fuel cell will be stable in the dormant state.

The storage tank 10, including the two subunits 12 and 14 and the top and bottom closures or plates 22 and 24, can be made from any suitable material and manufacturing process, for example, from machining or forming, from bar stock to powered metal technology, or worked from generally flat stock. Whatever method is selected as the most cost effective for the production volumes encountered, the final welded assembly should be spin balanced either individually, or collectively. The storage tank 10, baffles 16, top and bottom plates 22 and 24, ports 18 and 20, and segments of top and bottom plates 26, 28, 30, and 32 as well as any other component parts, may be coated to prevent gas leakage, oxidation, and hydrogen embrittlement. The protective coating also serves to ensure that the fuel cell will remain stable when left dormant and will be ready for use when desired by maintaining the integrity of the storage tank 10 and activation devices 50 during any period of dormancy. The protective coating selected will depend on the metals used in construction of the storage tank 10 and associated parts. The internal plating or coating of the storage tank 10 may be done after final assembly of the storage tank 10, but should be done before the activation devices 50 are installed and access ports 36 are welded shut.

FIGS. 2a through 2r show one embodiment of an activation device used to trigger the electrochemical reaction in the fuel cell. In this embodiment, the activation device 50 takes the form of an inertial switch. The activation devices 50 are placed in the access ports 36 in the bottom plate 24 of the storage tank 10. One activation device 50 is used in the portion of the storage tank 10 dedicated to oxygen storage 12 and one activation device 50 is used in the portion of the storage tank 10 used for hydrogen storage 14.

A variety of activation devices may be employed in the fuel cell, depending upon the environment in which the fuel cell will be used. For example, in an environment where the fuel cell will be "on board" or embedded within a portion of a moving carrier, such as within a projectile "round" in an ordnance application, an activation device which relies upon G-forces or centrifugal forces would be appropriate. The inventor has developed piston-type activators as well, but such activators are generally not easily adapted for use in the present invention. In the embodiment pictured in FIGS. 2a-2r, the activation device 50 includes a base 51 with a vertical support 53 and an arm support 55 holding an inertial arm 60. The activation device 50 is a subassembly, two of which are installed within the storage tank 10 of the fuel cell, one for the hydrogen and the other for the oxygen. The base 51 is screwed in or pushed in to position in the opening 36 (see FIGS. 1g and 1i) within the tank, depending on whether threads or a push fit connection is desired. In either mounting, the base 51 of the activation device 50 is preferably welded in place in the opening 36 after assembly to close the tank.

The base 51 is shown separately in FIGS. 2f and 2g. The base 51 is formed of by machining 0.050 inch thickness 304 stainless steel and in one embodiment has a diameter of 0.40 inches. The vertical support 53 as shown in FIGS. 2c, 2d, and 2e is formed preferably by stamping 0.010 inch thickness 304 stainless steel. The vertical support has a platform portion 57, an upright portion 59 and a crossbar 61. The platform 57 is fastened to the base 51, in the preferred embodiment, by welding, such as welding at four places. In an optional embodiment, the upright 59 is strengthened by forming a strengthening rib on the upright. This will enable the upright 59 to resist twisting in high spin conditions. The cross arm 61 supports the inertial arm. 60. The inertial arm 60 is shown individually in FIGS. 2*q* and 2*r*.

In FIGS. 2*a*-2*r*, the activation device 50 is composed of a spring washer 52 (FIGS. 2*i* and 2*j*), a back off spring 54 (FIGS. 2*k* and 2*l*), a weld stud 56 (FIGS. 2*m* and 2*n*), a Teflon bushing 58 (FIGS. 2*o* and 2*p*), and the inertial arm 60 (FIGS. 2*q* and 2*r*), as well as a base sub assembly 63 formed by the base 51 and vertical support 53 (FIG. 2*h*). The inertial arm 60 may take a variety of shapes, but should be generally long and narrow in construction with a conical piercing element at one end. The inertial arm 60 may be tapered from a pivot area toward an enlarged impacting end that would maximize the impact of the inertial arm 60 on the storage tank wall 90. If desired, the impacting end of the inertial arm 60 may take the form of a hammer head for additional impact energy. The inertial arm 60 may be round, square, rectangular, or other polygonal shape or configuration in cross section. A narrow strip of rectangular bar stock, as shown in FIG. 2*q* and 2*r*, will accomplish the desired objective, piercing the storage tank wall 90 to open the port 38 or 40 to the anode 78 or cathode 76, with little loss of effectiveness.

The inertial arm 60 may be approximately 0.050 by 0.050 inch in cross section, and about 0.350 inch long. In one embodiment it is formed from 304 stainless steel. The inertial arm 60 is mounted at one end to the base sub assembly 62, leaving the other end free to contact the side of the storage tank 10, puncturing the wall and opening the port 38 or 40 to allow oxygen or hydrogen to flow into the fuel cell assembly. The active end of the inertial arm 60 contains at least one projection 64 with a relatively sharp point. The projection 64 can be made from a hard tool steel, coated with a hard material, or comprise an insert to the inertial arm 60 made of carbide or a similar hard material. On the other end of the inertial arm 60 is a thru hole 68 used to mount the inertial arm 60. The thru hole 68 may encompass the bushing 58 or a coating to reduce friction.

The arm support 63 can, for example, be fabricated from metal as a stamping on a progressive die. On the arm support 63, a pivot pin 66 may be mounted by resistance welding, or other methods, although retaining clips and other fastening methods may also be used for this purpose. To prevent the projection 64 on the inertial arm 60 from blocking the punch-thru point in the wall 90 after activation, which could inhibit gas flow, a spring clip or back off spring 54 is designed to fit over the inertial arm 60. It also could be mounted to the arm support 63 or the tank wall 90. The spring clip or back off spring 54 may also be fabricated from metal as a stamping on a progressive die.

The activation device 50 is mounted on the base sub assembly 62. The base sub assembly 62 of each of the two activation devices 50 is made to match the two access ports 36 in the bottom plate 24 of the storage tank 10, one for each subunit. The activation devices 50 and base sub assemblies 62 may be positioned in the storage tank 10 so as to maintain the balance of the fuel cell in operation. After welding the activation devices 50 and base sub assemblies 62 into place in the bottom plate 24 of the storage tank 10, the tank may be spin-balanced again. Alternatively, the activation devices 50 may be mounted directly to the top plate 22 of the storage tank 10. This could be accomplished by machining supports in the top plate 22 or by welding or otherwise attaching an appropriately designed support bracket to the top plate 22.

The inertial arm 60 is mounted at a pivot point to allow it to swing after the ordnance launch or other activation event. The activation device 50 must also incorporate support for the inertial arm 60 to prevent premature or inadvertent puncture of the storage tank wall 90. The spring washer 52 shown in FIG. 2 is intended to maintain the proper positioning of the inertial arm 60, leaving space between the inertial arm 60 and the storage tank wall 90 until the desired activating action is taken and the forces intended to activate the fuel cell overcome the spring washer 52. The spring washer 52 is preferably implemented to move back under "G" or spin forces, and to allow the inertial arm 60 to break loose. Math models show that in the case of an ordnance environment, the forces of launch are more than sufficient to achieve the proper break away. Alternative methods for maintaining the proper position of the inertial arm prior to activation include tabs or other breakaway devices that would serve the same purpose.

In operation, the spring clip or back off spring 54 engages the storage tank wall 90 as the inertial arm 60 swings downward. The force generated by the environment in which the fuel cell is placed overcomes the force holding the inertial arm 60 in place. The inertial arm 60, pivoting at the point 68 on which it is mounted, until it strikes and pierces the storage tank wall 90 at the designated points. Subsequent to the piercing motion, the back off spring 54 causes the inertial arm 60 to withdraw from the point at which the storage tank 10 was pierced, opening the port 38 or 40 to gas flow. While a device that pulls the inertial arm 60 back from the openings made in the storage tank wall 90 is one way to prevent the inertial arm from impeding gas flow into the anode and cathode gas diffusers 72 and 74, the invention is not limited to this one embodiment. Other solutions to the problem, including grooves machined into the projection 64 that pierces the storage tank wall 90, would also ensure that the oxygen and hydrogen gases could exit the storage compartments 12 and 14 smoothly and would negate the need for the back off spring 54.

Once the activation devices 50 are installed and the storage tank 10 and activation device 50 assembly is balanced, the storage tank 10 can be charged with hydrogen and oxygen using any suitable method. The air may be evacuated from the storage tank 10 prior to charging. The remainder of the fuel cell may be evacuated at this time as well. After charging the storage tank 10 with hydrogen and oxygen into the appropriate compartments 12 and 14 through gas charging ports 34, the storage tank 10 may be mechanically sealed and then welded shut to form the storage tank 10 assembly pictured in FIG. 3*a*.

Figure 3B:
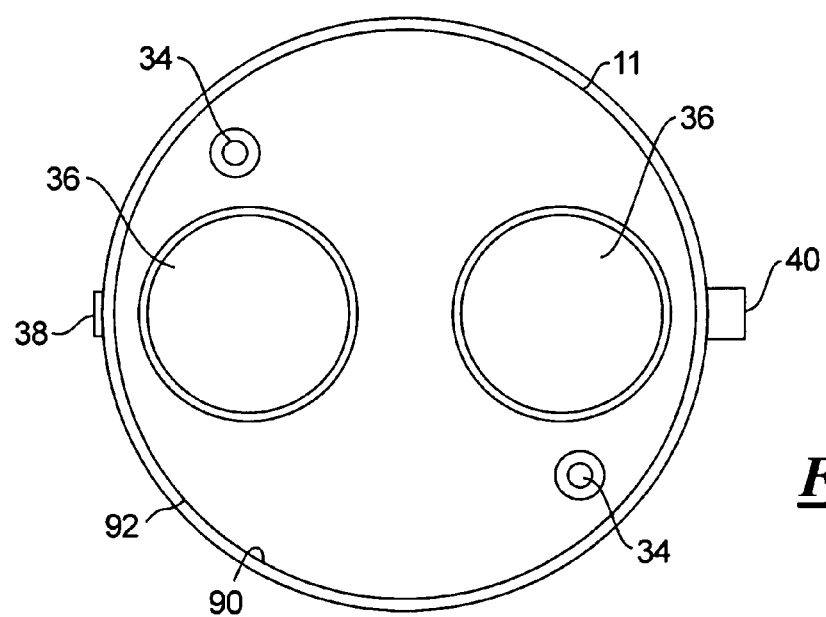

During the final welding process the gases must remain separated and the storage tank compartments 12 and 14 must remain intact. If needed, all welding may be carried out in an inert gas atmosphere to prevent contamination of the welds. After the final welding is completed, the storage tank 10 as pictured in FIGS. 3*a* and 3*b* is then ready to be assembled to the fuel cell to complete the PEMERY™ battery. The charging ports 34 and access ports 36 are shown in FIG. 3*b*. The illustrated tank assembly 10 of FIG. 3*a* has dimensions of 1.120 inches in overall diameter, a height of 0.670 inches, and a diameter at the end caps 26 and 30 of 1.080 inches.

Figure 4:
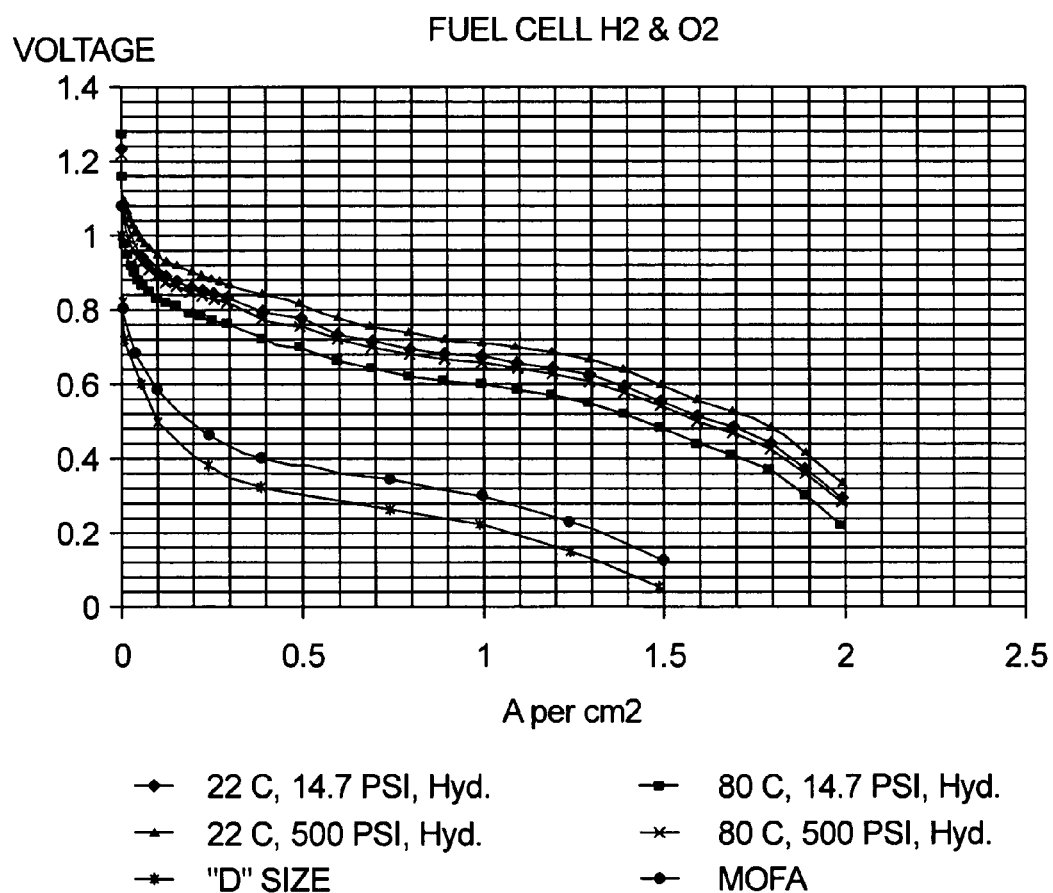
FIG. 4 is graph of performance curves of embodiments of a PEM fuel cell operating with and without hydration at various operating parameters.

The performance curves pictured in FIG. 4 indicate that the fuel cell described in this application could generate 0.44 volts at 350 mA draw. To achieve the design voltage and amperage, sixteen individual membrane electrode assemblies 70, with dimensions of 0.640 inch high by 0.740 inch wide and a surface area of about 3.0 $cm^2$ each, are connected in a series circuit as illustrated schematically in FIG. 5. In the present embodiment, the maximum current draw is estimated at 350 ma (just under 120 ma per $cm^2$), which delivers an operating voltage of about 8.3 VDC from the fuel cell. This level of performance exceeds the system requirements, i.e. fuse power needs.

The invention is not limited to the illustrated and described embodiment. Alternative combinations of fuel cells include, but are not limited to, a configuration where eight membrane electrode assemblies are placed in the PEMERY™ battery. The embodiment using eight membrane electrode assemblies would provide more surface area, spreading out the current draw and generating a higher voltage to partially offset the smaller number of membrane electrode assemblies used. This embodiment would provide approximately 5.8 volts at 325 mA of current draw. These specifications meet the requirements of most ordnance systems. The number of membrane electrode assemblies is determined by the required operating voltage of the system, rather than by any set design configuration. The versions described here are suggested for use in one particular application. Other applications of the fuel cell may require different numbers of membrane electrode assemblies to generate the required voltage.

Figure 5:
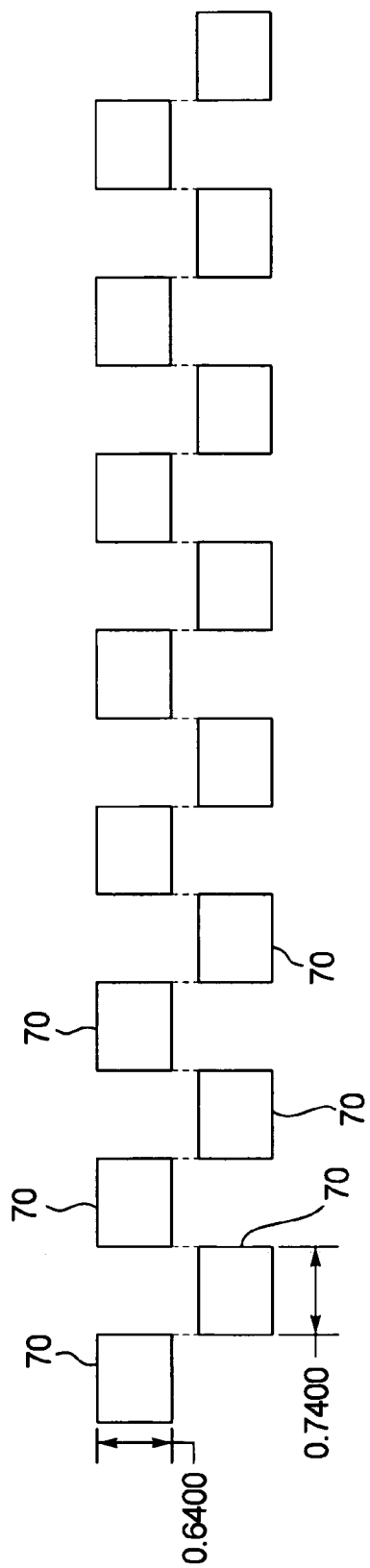
FIG. 5 is a schematic illustration of a series connection of fuel cell membrane elements to form a fuel membrane assembly.

In FIG. 5, the membrane electrode assemblies 70 are shown connected in a series circuit. This arrangement is accomplished in one embodiment by overlapping the ends of each membrane electrode assembly 70 to create one continuous assembly. The resulting series of membrane electrode assemblies 70 may be wrapped around the storage tank 10 assembly as pictured in FIGS. 6a and 6b.

Figures 6A, 6B:
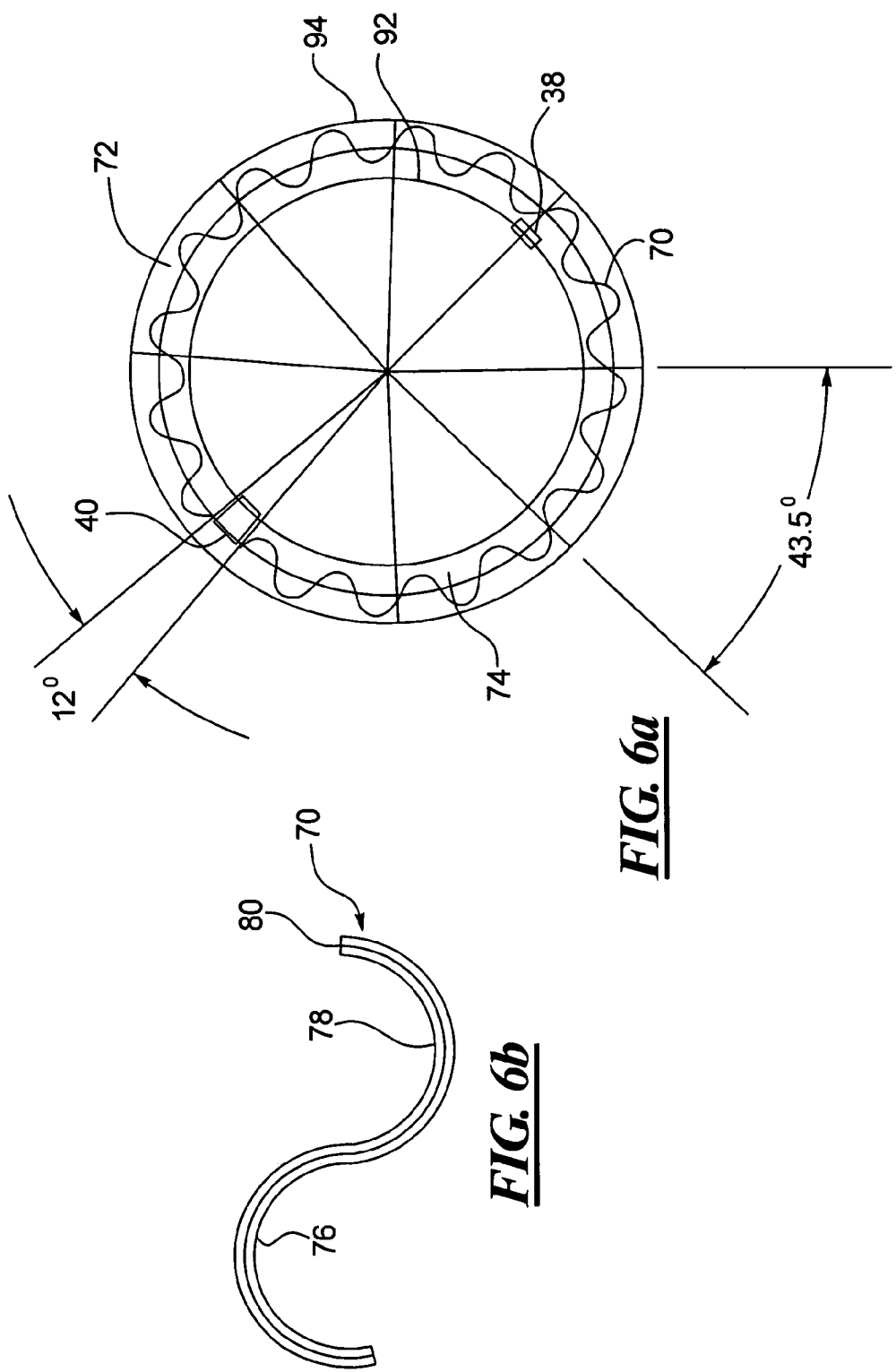
FIGS. 6a and 6b are an end cross-sectional view of the fuel cell assembly with the membrane assemblies from FIG. 5 in place and an enlarged view of a portion of the fuel cell membrane.

FIG. 6a provides additional detail on an embodiment of the invention having serially connected individual membrane electrode assemblies 70. Each membrane electrode assembly 70, as shown in FIG. 6b, may take the form of an "s" shape, with an anode 78 on one side, a cathode 78 on the other side, and a polymer electrolyte membrane 80 (or other suitable membrane material) in the center. This "s" shape may be as shallow or deep as needed, and may also take the form of multiple "s" shapes to maximize the area of the membrane electrode assemblies for the occupied space.

As the number of membrane electrode assemblies 70 needed and surface area required per membrane electrode assembly 70 increases, was determined through the use of the performance curves in FIG. 4, FIG. 6a demonstrates an arrangement of the membrane electrode assemblies 70 placed into the PEMERY™ battery. The space allocated for the membrane electrode assembly 70 is the space between the storage tank outer wall 92 and the inner side of the outer wall 94 of the PEMERY™ battery device. In the present embodiment, the diameter of the storage tank 10 is approximately 1.12 inches and the diameter of the inside of the PEMERY™ battery is approximately 1.44 inches. The difference between the two diameters, 0.320 inches, must be divided in two sections to accommodate the configuration of wrapping the membrane electrode assemblies 70 around the storage tank 10. The present embodiment allows approximately 0.160 inch for the membrane electrode assemblies 70 between the inner wall of the PEMERY™ battery 94 and outer wall of the storage tank 92. When the membrane electrode assemblies 70 is placed into the PEMERY™ battery, it takes the form of a cylinder 0.640 inch high with an outer diameter of 1.44 inches and an inner diameter of 1.12 inches.

When the a membrane electrode assembly 70 is placed in the corrugated surfaces of the cathode and anode gas diffusers 72 and 74, the membrane electrode assembly 70 forms an "S" shape as shown in FIG. 6 in a cross sectional view. As the next membrane electrode assembly 70 is laid into the corrugated shape, it completes an electrical circuit by placing the outside of the first membrane electrode assembly 70 on the inside of the second membrane electrode assembly 70, as there is a designed-in overlap on the membrane electrode assemblies 70. These two membrane electrode assemblies 70 are then in series electrically. As additional membrane electrode assemblies 70 are added, they also connect electrically such that when all are in place, there are sixteen membrane electrode assemblies 70 in a series electrical circuit. With the membrane electrode assemblies 70 in place and connected, the anode gas diffuser 74 is placed on the membrane electrode assemblies 70. The anode gas diffuser 74 can be two or more pieces, since a diffuser made from one piece will be difficult to implement in the present embodiment. Additionally, a gasket, not illustrated in the drawings, may be required at the top and bottom of the PEMERY™ battery to prevent the membrane electrode assemblies 70 from shorting out on the case of the battery 94. Finally, glues and sealants may be used during assembly to prevent gas leaks during fuel cell operation.

Referring again to FIG. 6a, the cross section of the PEMERY™ battery indicates not only the respective positions of the membrane electrode assemblies 70 and storage tank 10 within the outer walls of the PEMERY™ battery 94, but also demonstrates the way in which oxygen and hydrogen are delivered to the membrane electrode assemblies 70.

The cathode is where the oxygen is introduced to the fuel cell membrane. Cathode gas diffuser material 72 is located between the membrane electrode assemblies 70 and the inner wall of the PEMERY™ battery casing 94. The cathode gas diffuser 72 shown in FIG. 6a is composed of a solid porous material. The solid porous material may be metal, polymer, or any other suitable material. It is also possible that other materials, including non-solid materials may be used for the gas diffuser material 72. The cathode gas diffuser 72 fits around the storage tank 10 and supports the corrugated membrane. The gas flow port 38 extends into the cathode gas diffuser 72. The inner surface of the cathode gas diffuser 72 may be sealed with the appropriate sealant to the storage tank 10. The outer surface of the cathode gas diffuser 72 may have a corrugated shape, similar to a washboard. The cathode gas diffuser 72 may be made in one or more pieces, then assembled to the storage tank 10. The corrugated surface covers the outer surface of the gas storage tank 10, providing the surface that molds the membrane electrode assemblies 70 into the "s" shape as previously discussed and pictured in FIGS. 6a and 6b.

Anode gas diffuser material 74 shown in FIG. 6a is located between the membrane electrode assemblies 70 and the outer casing of the PEMERY™ battery 94. The anode gas diffuser 74 is where the hydrogen gas is introduced to the membrane electrode assembly 70. The gas port 40 bringing the hydrogen gas to the anode 78 is longer than the gas port 38 directing oxygen to the cathode 76 so that it may extend past the membrane electrode assembly 70 into the anode gas diffuser 74 where is allows the fuel gas, hydrogen in this case, to flow into the anode gas diffuser 74 isolated from the cathode 76, cathode gas diffuser 72, and oxygen gas. Electrical connections are made to the exterior of the PEMERY™ battery and the storage tank 10, membrane electrode assemblies 70, and gas diffusers 72 and 74 are placed into a formed metal shell 94 with appropriate sealing to complete the PEMERY™ battery. FIG. 6a illustrates some key angular dimensions in accordance with one embodiment of the invention.

Figure 7:
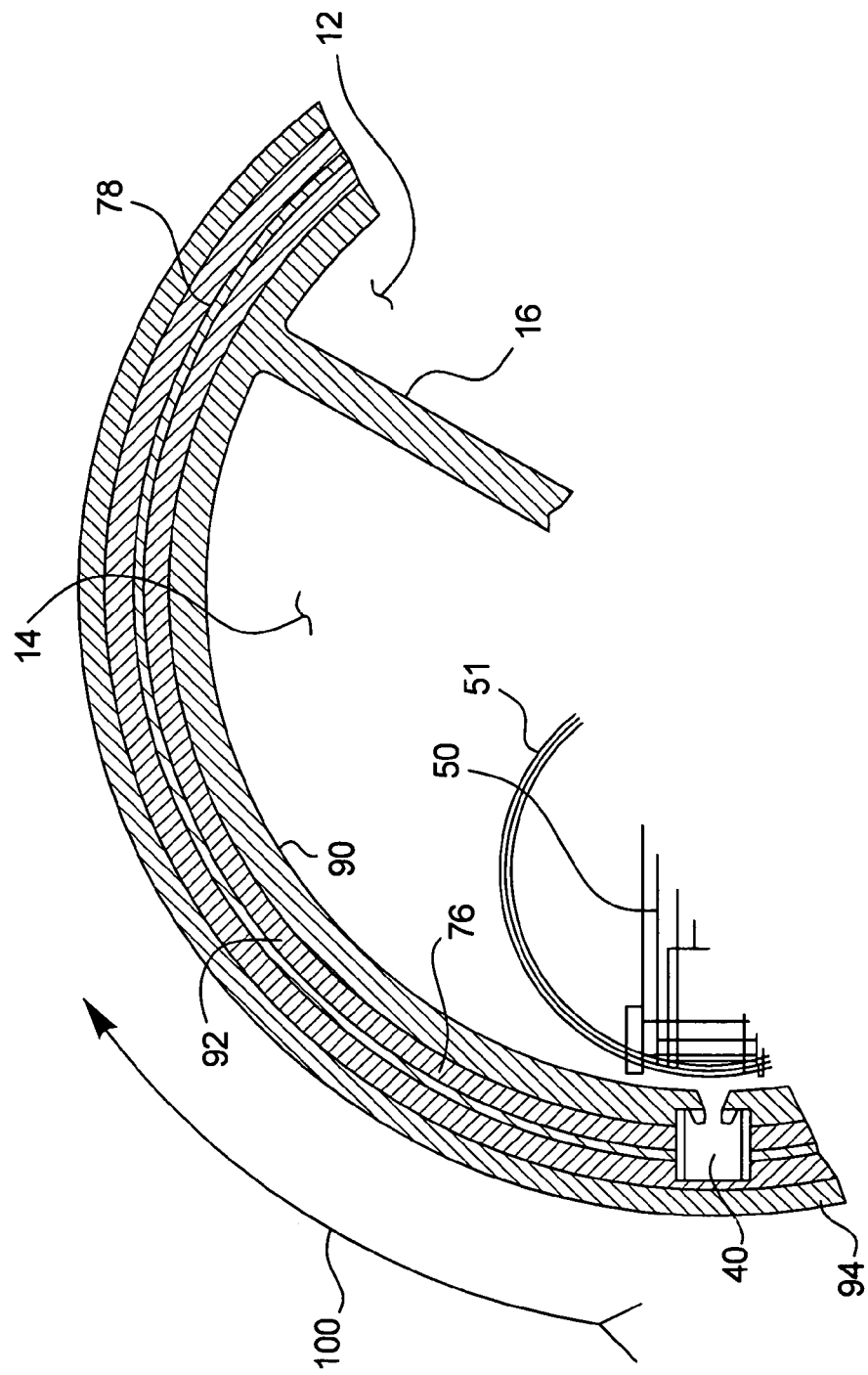
FIG. 7 is a enlarged view of a portion of a fuel cell assembly.

Turning next to FIG. 7, an enlarged cross section of a portion of the fully assembled fuel cell shows the present apparatus in detail. As indicated in the drawing, several applications of the fuel cell involve rotation of the fuel cell assembly, as indicated by arrow 100. The rotation of the fuel cell assembly may accomplish more than just providing the force needed to activate operation of the fuel cell, it may also provide force needed to push water formed by the electrochemical reaction through the membrane 80, maintaining proper membrane 80 hydration during operation. This is accomplished by positioning the anode 78 on the outside of the membrane electrode assembly 70 when in place in the fuel cell assembly. The hydrogen gas port 40, seen activated in FIG. 7 by having been punctured by the inertial arm of the switch 50, channels the hydrogen gas past the cathode gas diffuser 72, cathode side 76 of the membrane electrode assembly 70, and membrane 80 to the anode gas diffuser 74. The electrochemical reaction generates water as a byproduct on the cathode side 76 of the membrane electrode assembly 70, located on towards the inside of the fuel cell. The water is pushed outward by the centrifugal force of the spinning movement of the fuel cell. Thus, the arrangement of the cathode 76 on the inside and the anode 78 on the outside is designed to maintain hydration and effective functioning of the fuel cell during operation. This effect will create a kind of self hydration effect that will increase the performance of the fuel cell, which has, until now, been purposely kept dry to prevent freezing damage during cold storage.

Water on the anode side 78 of the membrane electrode assembly 70 aids in the migration of the protons created by the catalyst in breaking down the hydrogen atoms. The cathode 76 is provided on the inside of the spin, and the hydrogen on the outside of the spin. If spin is not an aspect of the environment in which the fuel cell is used, there will be some movement of water through the membrane via osmosis and the vapor pressure of the water. FIG. 7 shows this effect in an embodiment of the present invention which uses eight membrane electrode assemblies 70 in series instead of sixteen membrane electrode assemblies 70 in series. This embodiment delivers a lower electrical power than the sixteen membrane electrode assembly 70 embodiment previously described, as it involves fewer assemblies 70 and smaller surface area. One advantage of the eight membrane electrode assembly 70 embodiment is an increase in internal volume for gas storage of the hydrogen and oxygen, which yields a longer run time.

The removal of water from a fuel cell is another critical factor in fuel cell performance. If experimentation should determine that water removal from the fuel cell is more important than hydration of the fuel cell for performance in a desired application of the invention, an alternative embodiment may be used. In this alternative embodiment, the anode side of the membrane electrode assembly 78 and anode gas diffuser 74 would be placed towards the inside of the fuel cell, adjacent to the storage tank 10. The cathode side of the membrane electrode assembly 76 and cathode gas diffuser 72 would be placed towards the outside of the fuel cell, adjacent to the casing 94. In this embodiment, water generated as a byproduct of the electrochemical reaction would be pushed to the outside wall of the battery 94 by centrifugal force. In this embodiment, the longer port 40 would be connected to the oxygen storage compartment 12 and the shorter port 38 would be connected to the hydrogen storage compartment 14.

Figure 8B:
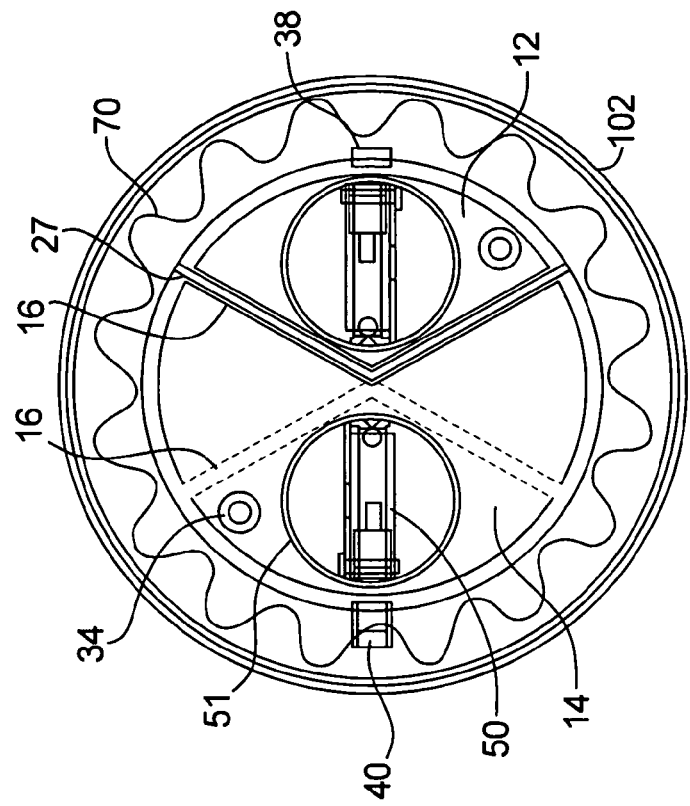
FIGS. 8a and 8b is both a side view and cross sectional view of a preferred embodiment of the fuel cell.
Figure 8A:
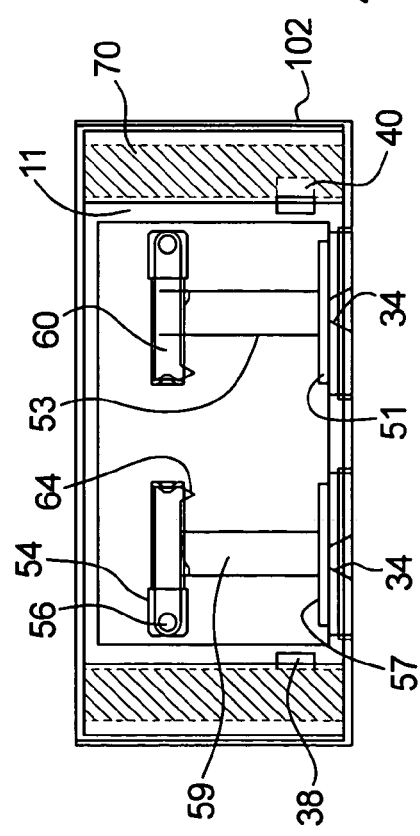

FIGS. 8a and 8b illustrate the fuel cell assembly with all parts in place, a complete illustration of one embodiment of the invention. FIG. 8a and 8b illustrate, in cross sectional views, a representation of an assembled Polymer Electrolyte Membrane Battery, or PEMERY™ battery Multi-Option Fuse for Artillery (MOFA) in accordance with one embodiment. The two inner subunits or compartments 12 and 14 with the inertial arms 60 are the hydrogen and oxygen storage tanks 12 and 14 that can be charged to at least 500 PSI, if required. Charge pressure determines run time at any given current draw with a fixed volume. Mathematical modeling shows that higher pressures are possible if desired for the illustrated implementation, or the wall thickness could be reduced to reduce weight of the PEMERY™ battery. The two inertial arms 60 are shown in FIG. 8a with the baffles 16 removed for clarity, and are illustrated in their home positions. The two gas charging ports 34 and the two distribution manifolds 38 and 40 are also shown. The inertial arms 60 are constructed to swing about the pivot axis 56 so as to bring the piercing point 64 into contact with the respective valves or manifolds 38 and 40. The inertial arms are caused to swing to pierce the valves or manifolds 38 and 40 by force on the apparatus, such as by rotational force or axial force. This may be the result of the firing or launching of a projectile containing the present fuel cell. By piercing the valves 38 and 40, gas contained in the compartments is permitted access to the fuel cell membrane, activating the fuel cell. The fuel cell assembly with the baffles 16 in place is shown in FIG. 8b. The positions of the inertial switches 50 to the valves 38 and 40 so that opening of the valves by the switches 50 supplies the stored gas to the membrane electrode assemblies 70 is also evident in the cross-section of the PEMERY™ battery. The apparatus is enclosed win a housing 102. The overall configuration of the housing of the illustrated embodiment is a flattened disc, although other configurations and shapes are possible.

In order to create an operational fuel cell to meet the requirements of the present embodiment, or other possible embodiments, various other components such as gas diffusers, current collectors, conductors, and sealants, are required. Many of these items are off the shelf, although there may be some adjustments made to work in this application. The innovative aspects of the present invention are embodied in the shape of the membrane electrode assemblies 70 and the gas diffusion manifolds 38 and 40, as well as keeping the hydrogen gas on one side and the oxygen gas on the other side of the storage tank 10.

As some of the potential environments for use of the present invention involve different types of motion, the balance of the fuel cell becomes a factor in the performance of the desired application. For example, in an ordnance environment, the fuel cell may be subjected to a high RPM spinning action during post-launch. Thus, extra caution must be taken with the physical design of the fuel cell to create a well-balanced construction.

While the invention has been described in an ordnance environment, it should not be limited to use in only that type of application. This invention can be provide a compact power source in a variety of environments, such as personal safety alarms, emergency or investigatory tracking devices, deep space and undersea exploration, and any other application requiring a compact source of energy. The invention is capable of remaining dormant for long periods of time prior to use, but the application of the invention should not be limited to only those in which the potential for dormancy exists, as the fuel cell can also be used immediately.

Upon careful reviewing of the foregoing specification and drawings, it will be evident that this invention may be implemented with any modifications, combinations and alterations in a number of ways which may differ from those set forth. The particular arrangements disclosed are meant to be illustrative only and not limiting as to the scope of the invention which is to be given the full breadth of any claims associated herewith and all equivalents thereof.

I claim:

1. A fuel cell for generating electrical current through an electrochemical reaction between a fuel gas and an oxidant gas, comprising:

a housing having an axis of rotation;

at least one membrane electrode assembly in said housing;

a first compartment in said housing for storing fuel gas, said first compartment being selectively connectable in fluid communication with said at least one membrane electrode assembly, said first compartment extending a full height of said housing along said axis of rotation;

a second compartment in said housing for storing oxidant gas, said second compartment being selectively connectable in fluid communication with said at least one membrane electrode assembly, said second compartment extending a full height of said housing along said axis of rotation, said first and second compartments being disposed relative to a rotational axis of said housing for rotational symmetry;

at least one activation device for initiating the electrochemical reaction by providing fluid communication between said at least one membrane electrode assembly and said first and second compartments; said at least one activation device including pivoting arms on supports that swing downward and outward upon subjecting the device to inertial forces; and an electrical connection to said at least one membrane electrode assembly for collecting power produced by fuel cell.

2. A fuel cell as claimed in claim 1, wherein said at least one membrane electrode assembly is of a plurality of membrane element electrically connected to one another in series connection.

3. A fuel cell as claimed in claim 1, wherein said at least one membrane electrode assembly is of a corrugated shape.

4. A fuel cell as claimed in claim 1, wherein said first compartment for storing said fuel gas and said second compartment for storing said oxidant gas are substantially enclosed by said at least one membrane electrode assembly.

5. A fuel cell as claimed in claim 1, wherein at least one of said first and second compartments include baffles disposed to rotationally balance said fuel cell.

6. A fuel cell as claimed in claim 5, wherein said baffles include baffle portions that separate said first compartment from said second compartment.

7. A fuel cell as claimed in claim 5, wherein said baffles include baffle portions within at least one of said first and second compartments.

8. A fuel cell as claimed in claim 1, wherein said at least one activation device is triggered for activation of the fuel cell by inertia.

9. A fuel cell as claimed in claim 8, wherein said at least one activation device is triggered for activation of the fuel cell by rotational inertia.

10. A fuel cell as claimed in claim 8, wherein said at least one activation device includes a pivotably mounted arm movable by inertia, said pivotably mounted arm having a piercing member, said at least one activation device further includes a membrane disposed for piercing contact by said piercing member upon subjecting said pivotably mounted arm to sufficient inertia.

11. A fuel cell for generating electrical current through an electrochemical reaction between a fuel gas and an oxidant gas, comprising:

a housing:

at least one membrane electrode assembly in said housing, said at least one membrane electrode assembly having a corrugated configuration;

at least one storage container for a fuel cell reactant in said housing, said at least one storage container being selectively connectable in fluid communication with said at least one membrane electrode assembly; and at least one activation device for initiating the electrochemical reaction by providing fluid communication between said at least one membrane electrode assembly and said first and second compartments; said at least one activation device including pivoting arms on supports that swing downward and outward upon subjecting the device to inertial forces; and an electrical connection to said at least one membrane electrode assembly for collecting power produced by the fuel cell.

12. A fuel cell as claimed in claim 11, wherein said storage container includes at least two subunits for storing said fuel and oxidant gases separately;

at least one baffle in said storage container to define said at least two subunits; and at least two ports in said storage container through which a flow of said fuel and oxidant gases proceeds from said storage container to said membrane electrode assembly.

13. A fuel cell as claimed in claim 12, wherein said at least one baffle includes two baffle elements arranged to define two approximately 60 degree angles and two approximately 120 degree angles.

14. A fuel cell as claimed in claim 12, wherein said at least one baffle defines an opening through said baffle for gas flow between portions of said storage container separated by said baffle.

15. A fuel cell as claimed in claim 12, further comprising:
closures for top and bottom surfaces of said storage container, said closures contacting said at least one baffle.

16. A fuel cell as claimed in claim 15, wherein said at least one baffle includes a baffle extension extending from at least one of said top and bottom surfaces of said storage container, said closures being configured to fit in cooperative engagement with said baffle extension.

17. A fuel cell as claimed in claim 11, further comprising:
a coating on said storage container to seal said storage container against leakage.

18. A fuel cell as claimed in claim 11, further comprising:
an activation mechanism in said housing and selectively operable to release gas from said storage container to said at least one membrane electrode assembly.

19. A fuel cell as claimed in claim 18, wherein said activation mechanism includes:

an inertia arm mounting for pivoting movement upon being subjected to inertial force; and a membrane closing an opening of said storage container; said membrane being disposed for opening said membrane upon said inertial arm pivoting under influence of inertial force.

20. A fuel cell as claimed in claim 19, wherein said inertial arm includes a piercing member disposed to pierce said membrane upon subjecting said inertial arm to inertial force.

21. A fuel cell as claimed in claim 19, wherein said activation mechanism includes a biasing spring mounted to bias said inertial arm to a position out of contact with said membrane.

22. A fuel cell as claimed in claim 11, further comprising:
a cavity in which said at least one membrane electrode assembly is mounted; and a porous gas diffuser in said cavity adjacent said at least one membrane electrode assembly.

23. A fuel cell as claimed in claim 22, wherein said porous gas diffuser has a corrugated surface abutting said at least one membrane electrode assembly.

24. A fuel cell as claimed in claim 22, wherein said porous gas diffuser is a first porous gas diffuser and comprising a second porous gas diffuser mounted on an opposite side of said at least one membrane electrode assembly from said first porous gas diffuser.

25. A fuel cell as claimed in claim 11, wherein at least one membrane electrode assembly extends substantially entirely around said storage container.

26. A method for operating a fuel cell, comprising the steps of:
- providing a fuel cell with at least one membrane electrode assembly in a housing;
- providing a storage container having first and second compartments for fuel gas and oxidant gas in said housing;
- providing an rotationally operated inertial trigger in said housing;
- supplying reactant gases from said storage container to said at least one membrane electrode assembly upon subjecting said housing to rotational forces.

27. A method as claimed in claim 26, further comprising the step of:
- storing said fuel gas and oxidant gas separated from said at least one membrane electrode assembly until said housing is subjected to rotational forces.

28. A method as claimed in claim 26, further comprising the step of: operating said fuel cell in a spinning environment.

29. A method as claimed in claim 26, further comprising the step of: driving byproduct water through said at least one membrane electrode assembly during operation of said fuel cell by spinning said housing.

30. A method as claimed in claim 26, further comprising the step of: using said fuel cell in at least one of an ordnance and a munition.

* * * * *